US012709329B1

(12) United States Patent
Moshchuk et al.

(10) Patent No.: US 12,709,329 B1
(45) Date of Patent: Aug. 18, 2026

(54) LATERAL CONTROLLER FOR AUTONOMOUS LOW-G MANEUVERING USING FRONT AND REAR STEERING

(71) Applicant: GM Global Technology Operations LLC, Detroit, MI (US)

(72) Inventors: Nikolai K. Moshchuk, Grosse Pointe Farms, MI (US); SeyedAlireza Kasaiezadeh Mahabadi, Waterloo (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 3 days.

(21) Appl. No.: 19/055,739

(22) Filed: Feb. 18, 2025

(51) Int. Cl.
*B62D 7/15* (2006.01)
*B60W 30/045* (2012.01)
*B60W 60/00* (2020.01)

(52) U.S. Cl.
CPC ........... *B62D 7/159* (2013.01); *B60W 30/045* (2013.01); *B60W 60/001* (2020.02); *B60W 2710/20* (2013.01)

(58) Field of Classification Search
CPC ... B62D 7/159; B60W 60/001; B60W 30/045; B60W 2710/20
See application file for complete search history.

(56) References Cited

U.S. PATENT DOCUMENTS

| | | | | |
|---|---|---|---|---|
| 7,032,763 | B1 * | 4/2006 | Zakula, Sr. | B66C 19/007 701/44 |
| 9,934,688 | B2 * | 4/2018 | Olson | B60W 40/10 |
| 2017/0031361 | A1 * | 2/2017 | Olson | G06V 20/56 |
| 2020/0207412 | A1 | 7/2020 | Al Assad et al. | |

OTHER PUBLICATIONS

German Office Action for German Application No. 102025111602.4; dated Oct. 29, 2025; 6 pages.

Tan, X. et al. "Optimal Control Method of Path Tracking for Four-Wheel Steering Vehicles", Actuators, 2022, 11, 61. https://doi.org/10.3390/act11020061, 16 pages.

* cited by examiner

*Primary Examiner* — Ramsey Refai
(74) *Attorney, Agent, or Firm* — CANTOR COLBURN LLP

(57) ABSTRACT

A system for operating an autonomous vehicle determines a desired path of the autonomous vehicle in a turn, calculates a current trajectory for the vehicle in the turn based on at least a front road wheel angle of a front wheel of the vehicle and a rear road wheel angle of a rear wheel of the vehicle, determines a cross-track error between the desired path and the current trajectory, determines a heading error between the desired path and the current trajectory, creates a tracking cost function based on the cross-track error and the heading error, performs an optimization operation on the tracking cost function to determine a value of at least one of the front road wheel angle and the rear road wheel angle that reduces at least one of the cross-track error and the heading error, and controls a steering of the autonomous vehicle based on the value.

20 Claims, 5 Drawing Sheets

LATERAL CONTROLLER FOR AUTONOMOUS LOW-G MANEUVERING USING FRONT AND REAR STEERING

The subject disclosure relates to vehicles and, in particular, to a system and method for maintaining the vehicle along a curved path using front and rear steering.

An autonomous vehicle operates by determining a projected trajectory for the vehicle and tracking the trajectory at it moves along a road. Methods are known for tracking the trajectory using only front wheel steering. However, such tracking has to be corrected when using both front and rear steering, especially on a curved trajectory, such as a 90-degree turn, a U-turn, a lane change, etc. Accordingly, it is desirable to provide a method for tracking a trajectory for a vehicle using both front and rear steering.

SUMMARY

In one exemplary embodiment, a method for operating an autonomous vehicle is disclosed. The method includes determining a desired path of the autonomous vehicle in a turn, calculating a current trajectory for the autonomous vehicle in the turn based on at least a front road wheel angle of a front wheel of the autonomous vehicle and a rear road wheel angle of a rear wheel of the autonomous vehicle, determining a cross-track error between the desired path and the current trajectory, determining a heading error between the desired path and the current trajectory, creating a tracking cost function based on the cross-track error and the heading error, performing an optimization operation on the tracking cost function to determine a value of at least one of the front road wheel angle and the rear road wheel angle that reduces at least one of the cross-track error and the heading error, and controlling a steering of the autonomous vehicle based on the value of the at least one of the front road wheel angle and the rear road wheel angle.

In addition to one or more of the features described herein, the method further includes applying a constraint to the optimization operation to limit a rate of change of at least one of the front road wheel angle and the rear road wheel angle.

In addition to one or more of the features described herein, the method further includes determining a plurality of waypoints for the desired path, determining the cross-track error and the heading error for each of the plurality of waypoints, determining a cross-track cost function based on the cross-track errors, determining a heading error cost function based on the heading errors, and creating the tracking cost function by summing the cross-track cost function and the heading error cost function.

In addition to one or more of the features described herein, the method further includes determining the cross-track error and the heading error for a waypoint using a first tangent line to the waypoint and a second tangent line to the current trajectory, wherein the second tangent line intersects the current trajectory at an intersection of the current trajectory and a radial line passing through the waypoint and a center of rotation of the current trajectory.

In addition to one or more of the features described herein, the current trajectory is a semi-circular arc about a center of rotation.

In addition to one or more of the features described herein, the desired path is one of a 90-degree turn, a U-turn, and a lane change.

In addition to one or more of the features described herein, performing the optimization operation further includes performing a two-dimensional nonlinear optimization operation.

In another exemplary embodiment, a system for operating an autonomous vehicle is disclosed. The system includes a processor. The processor is configured to determine a desired path of the autonomous vehicle in a turn, calculate a current trajectory for the autonomous vehicle in the turn based on at least a front road wheel angle of a front wheel of the autonomous vehicle and a rear road wheel angle of a rear wheel of the autonomous vehicle, determine a cross-track error between the desired path and the current trajectory, determine a heading error between the desired path and the current trajectory, create a tracking cost function based on the cross-track error and the heading error, perform an optimization operation on the tracking cost function to determine a value of at least one of the front road wheel angle and the rear road wheel angle that reduces at least one of the cross-track error and the heading error, and control a steering of the autonomous vehicle based on the value of the at least one of the front road wheel angle and the rear road wheel angle.

In addition to one or more of the features described herein, the processor is further configured to apply a constraint to the optimization operation to limit a rate of change of at least one of the front road wheel angle and the rear road wheel angle.

In addition to one or more of the features described herein, the processor is further configured to determine a plurality of waypoints for the desired path, determine the cross-track error and the heading error for each of the plurality of waypoints, determine a cross-track cost function based on the cross-track errors, determine a heading error cost function based on the heading errors, and create the tracking cost function by summing the cross-track cost function and the heading error cost function.

In addition to one or more of the features described herein, the processor is further configured to determine the cross-track error and the heading error for a waypoint using a first tangent line to the waypoint and a second tangent line to the current trajectory, wherein the second tangent line intersects the current trajectory at an intersection of the current trajectory and a radial line passing through the waypoint and a center of rotation of the current trajectory.

In addition to one or more of the features described herein, the current trajectory is a semi-circular arc about a center of rotation.

In addition to one or more of the features described herein, the desired path is one of a 90-degree turn, a U-turn, and a lane change.

In addition to one or more of the features described herein, the processor is further configured to perform the optimization operation by performing a two-dimensional nonlinear optimization operation.

In yet another exemplary embodiment, an autonomous vehicle is disclosed. The autonomous vehicle includes a first sensor for measuring a front road wheel angle of a front wheel of the autonomous vehicle, a second sensor for measuring a rear road wheel angle of a rear wheels of the autonomous vehicle, and a processor. The processor is configured to determine a desired path of the autonomous vehicle in a turn, calculate a current trajectory for the autonomous vehicle in the turn based on at least the front road wheel angle and the rear road wheel angle, determine a cross-track error between the desired path and the current trajectory, determine a heading error between the desired path and the current trajectory, create a tracking cost function based on the cross-track error and the heading error, perform an optimization operation on the tracking cost function to determine a value of at least one of the front road wheel angle and the rear road wheel angle that reduces at least one of the cross-track error and the heading error, and control a steering of the autonomous vehicle based on the value of the at least one of the front road wheel angle and the rear road wheel angle.

In addition to one or more of the features described herein, the processor is further configured to apply a constraint to the optimization operation to limit a rate of change of at least one of the front road wheel angle and the rear road wheel angle.

In addition to one or more of the features described herein, the processor is further configured to determine a plurality of waypoints for the desired path, determine the cross-track error and the heading error for each of the plurality of waypoints, determine a cross-track cost function based on the cross-track errors, determine a heading error cost function based on the heading errors, and create the tracking cost function by summing the cross-track cost function and the heading error cost function.

In addition to one or more of the features described herein, the processor is further configured to determine the cross-track error and the heading error for a waypoint using a first tangent line to the waypoint and a second tangent line to the current trajectory, wherein the second tangent line intersects the current trajectory at an intersection of the current trajectory and a radial line passing through the waypoint and a center of rotation of the current trajectory.

In addition to one or more of the features described herein, the current trajectory is a semi-circular arc about a center of rotation.

In addition to one or more of the features described herein, the desired path is one of a 90-degree turn, a U-turn, and a lane change.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
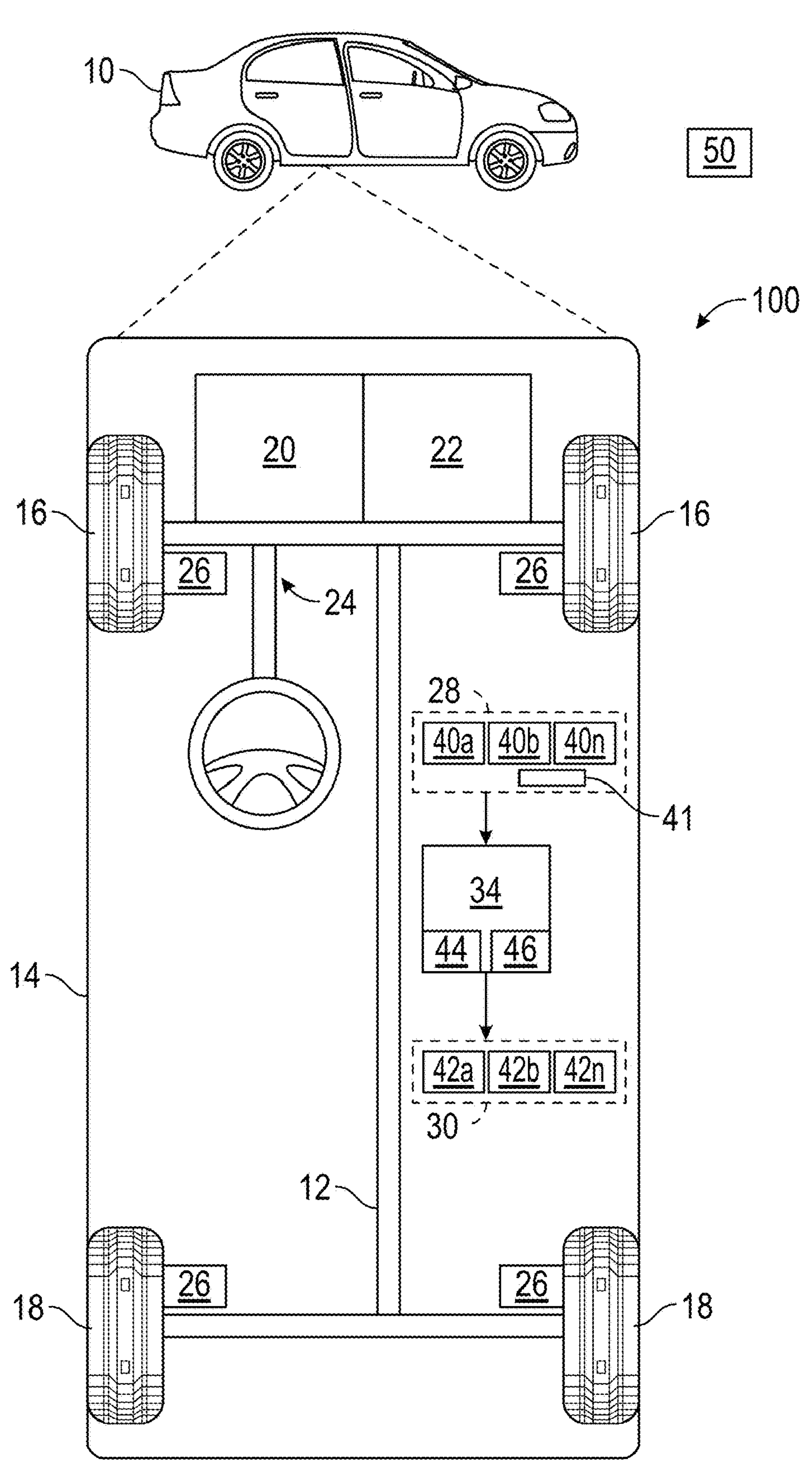
FIG. 1 shows an autonomous vehicle with an associated trajectory planning system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an autonomous vehicle 10 with an associated trajectory planning system depicted at 100. In general, the trajectory planning system 100 determines a trajectory plan for automated driving of the autonomous vehicle 10. The autonomous vehicle 10 generally includes a chassis 12, a body 14, front wheels 16, and rear wheels 18. The body 14 is arranged on the chassis 12 and substantially encloses components of the autonomous vehicle 10. The body 14 and the chassis 12 may jointly form a frame. The front wheels 16 and rear wheels 18 are each rotationally coupled to the chassis 12 near respective corners of the body 14.

In various embodiments, the trajectory planning system 100 is incorporated into the autonomous vehicle 10. The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. At various levels, an autonomous vehicle can assist the driver through a number of methods, such as warning signals to indicate upcoming risky situations, indicators to augment situational awareness of the driver by predicting movement of other agents warning of potential collisions, etc. The autonomous vehicle has different levels of intervention or control of the vehicle through coupled assistive vehicle control all the way to full control of all vehicle functions. The autonomous vehicle 10 can be any of a Level One through Level Five system. A Level 1 system includes driver assistance and performs a single autonomous task at a time, such as steering or braking. The Level 1 system can include cruise control and lane detection. A Level 2 system includes partial driving automation. Such a vehicle can control both steering and speed, but the driver must be ready to take over in an emergency. A Level 3 system is a conditional driving automation system that includes environmental detection capabilities. Such a vehicle can perform most driving tasks, but a human override is still required. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, and a controller 34. The propulsion system 20 may, in various embodiments, include an internal combustion engine, an electric machine such as a traction motor, and/or a fuel cell propulsion system. The transmission system 22 is configured to transmit power from the propulsion system 20 to the front wheels 16 and rear wheels 18 according to selectable speed ratios. According to various embodiments, the transmission system 22 may include a step-ratio automatic transmission, a continuously variable transmission, or other appropriate transmission. The brake system 26 is configured to provide braking torque to the front wheels 16 and rear wheels 18. The brake system 26 may, in various embodiments, include friction brakes, brake by wire, a regenerative braking system such as an electric machine, and/or other appropriate braking systems. The steering system 24 can be a four-wheel steering system that controls the road wheel angles of one or more of the front wheels 16 and rear wheels 18.

The sensor system 28 includes one or more sensing devices 40*a*-40*n* that sense observable conditions of the exterior environment and/or the interior environment of the autonomous vehicle 10. The sensing devices 40*a*-40*n* can include, but are not limited to, radars, lidars, global positioning systems, optical cameras, thermal cameras, ultrasonic sensors, and/or other sensors. The sensing devices 40*a*-40*n* obtain measurements or data related to various objects or agents 50 within the vehicle's environment. Such agents 50 can be, but are not limited to, other vehicles, pedestrians, bicycles, motorcycles, etc., as well as non-moving objects. The sensing devices 40*a*-40*n* can also obtain traffic data, such as information regarding traffic signals and signs, etc.

The sensor system 28 further includes internal sensing devices 41 that monitor the driver or user. The internal sensing devices 41 can include a camera or digital camera directed at a head of the driver to capture an image or video of a face of the driver. The internal sensing devices 41 can also include a first steering wheel angle sensor for measuring a steering wheel angle of the rear wheels and a second steering wheel angle sensor for measuring a steering wheel angle of the front wheels.

The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as ventilation, music, lighting, etc. (not numbered).

The controller 34 includes a processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. The instruction may also perform logic, calculations, methods and/or algorithms for controlling steering of the vehicle, including controlling road wheel angles of one or more of the front wheels 16 and rear wheels 18, using the methods disclosed herein.

Figure 2:
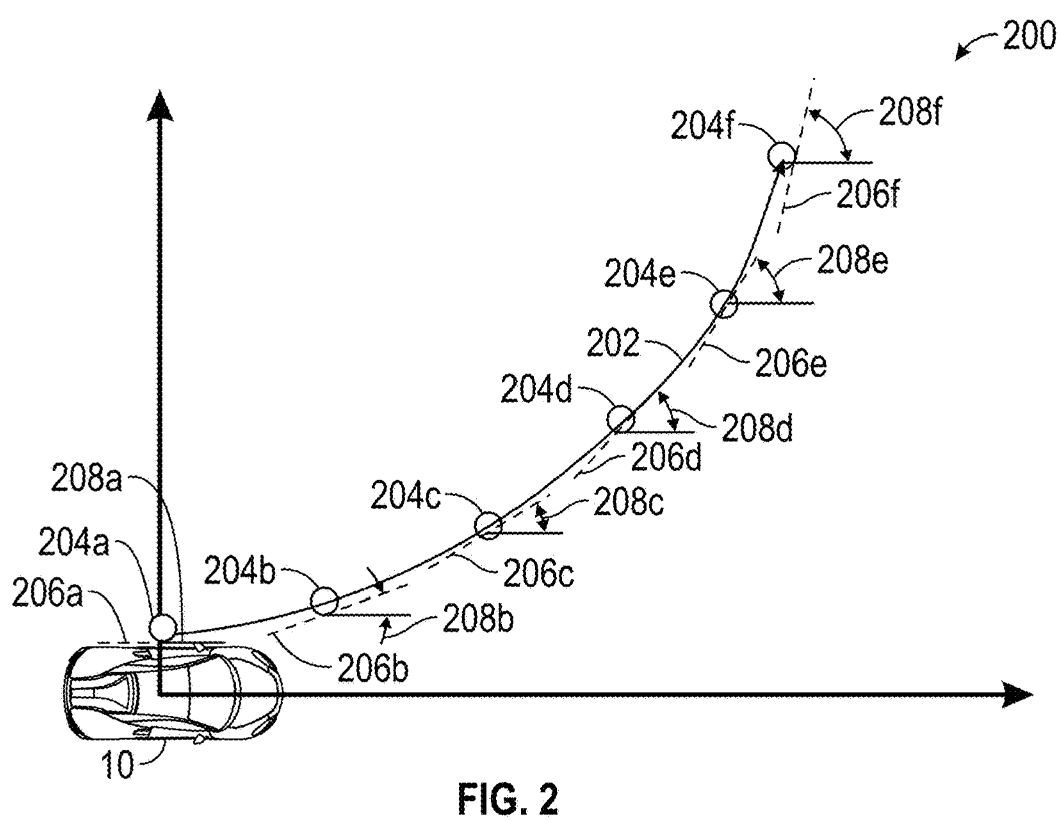
FIG. 2 is a plot showing an area including a desired path for the vehicle during a turn.

FIG. 2 is a plot 200 showing an area including a desired path for the vehicle during a turn. The area of the plot 200 is in a reference frame of the vehicle. The plot 200 is parameterized by a x-dimension for the area extending along the abscissa and a y-dimension for the area extending along the ordinate axis. The desired path is illustrated by a curve 202. A plurality of waypoints 204*a*-204*f* are shown along the desired path, with each of the plurality of waypoints 204*a*-204*f* lying at a point along the curve 202. Each of the plurality of waypoints 204*a*-204*f* has an associated tangent line 206*a*-206*f*. Each tangent line 206*a*-206*f* forms a heading angle 208*a*-208*f* with respect to the abscissa. The headings of the autonomous vehicle 10 at each of the plurality of waypoints 204*a*-204*f* are represented by respective heading angles 208*a*-208*f*.

Figure 3:
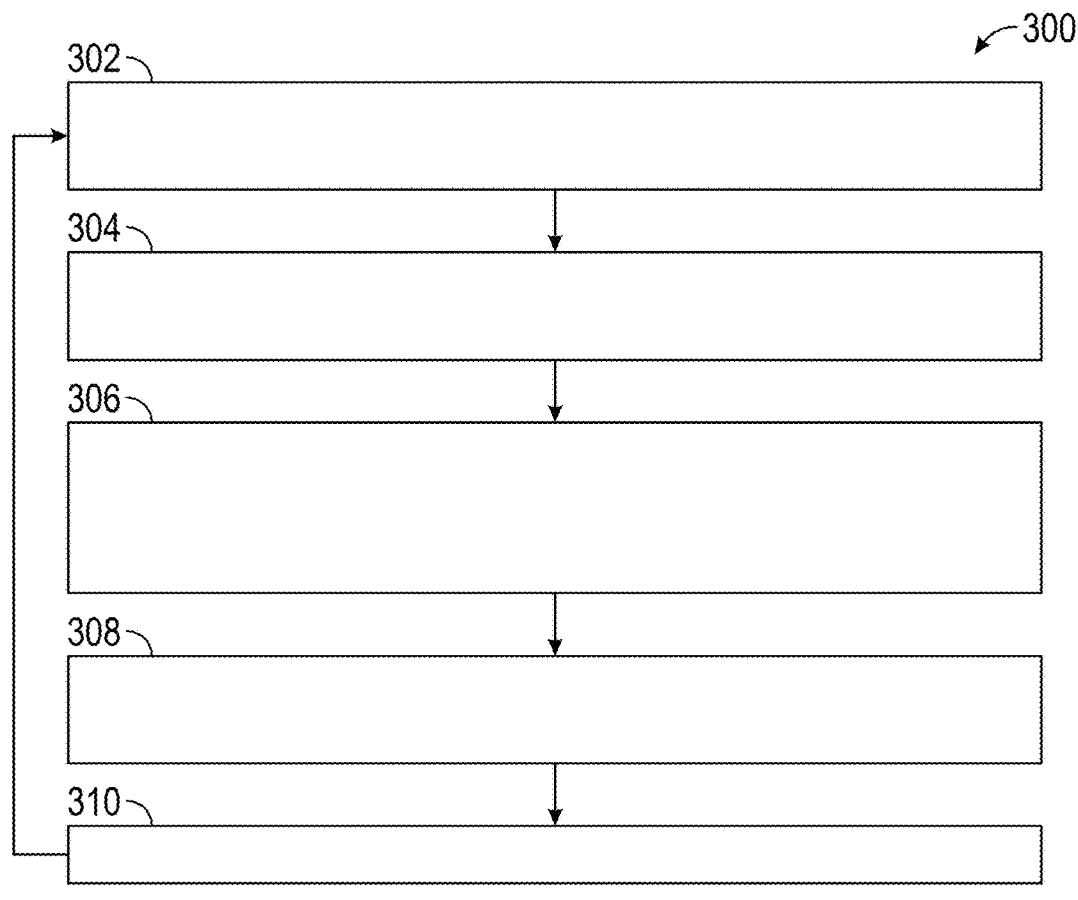
FIG. 3 shows a flowchart of a method for moving the autonomous vehicle along the desired path during the turn.

FIG. 3 shows a flowchart 300 of a method for moving the autonomous vehicle 10 along a desired path (such as curve 202) during a turn. In box 302, the method begins as the vehicle enters a turn or curved section. A rear road wheel angle 81 and a front road wheel angle 82 are measured using a road wheel angle sensors for each wheel or they can be derived from an electric power steering motor angle and steering angle sensor. In addition, waypoints 202*a*-202*f* are determined along the desired path of the vehicle.

In box 304, a search range is determined for the road wheel angle (i.e., each of the front road wheel angle and the rear road wheel angle). The search range can be based on a maximum rate of change (maxRWArate) for the road wheel angle and a sample time (ΔT) for the vehicle, as shown in Eq. (1):

$$RWA_{measured} - \max RWArate * \Delta T < RWA < RWA_{measured} + maxRWArate * \Delta T \quad \text{Eq. (1)}$$

where $RWA_{measured}$ refers to either the rear road wheel angle $\delta_1$ or the front road wheel angle $\delta_2$.

In box 306, a control goal is selected for minimizing a cross-track error between the desired path and a current trajectory of the vehicle and a heading error between the desired path and a current trajectory of the vehicle. In box 308, a two-dimensional nonlinear optimization method is performed to select an optimal road wheel angle (or a value of an optimal road wheel angle) for at least one of the front road wheel angle and the rear road wheel angle that minimizes a measure between the current trajectory and the desired path. In box 310, a command is sent to the vehicle to steer the vehicle using at least one of the optimal front road wheel angle and the optimal rear road wheel angle. Once the command has been sent, the method can return to box 302 for additional calculations based on the new or updated position of the vehicle.

Figure 4:
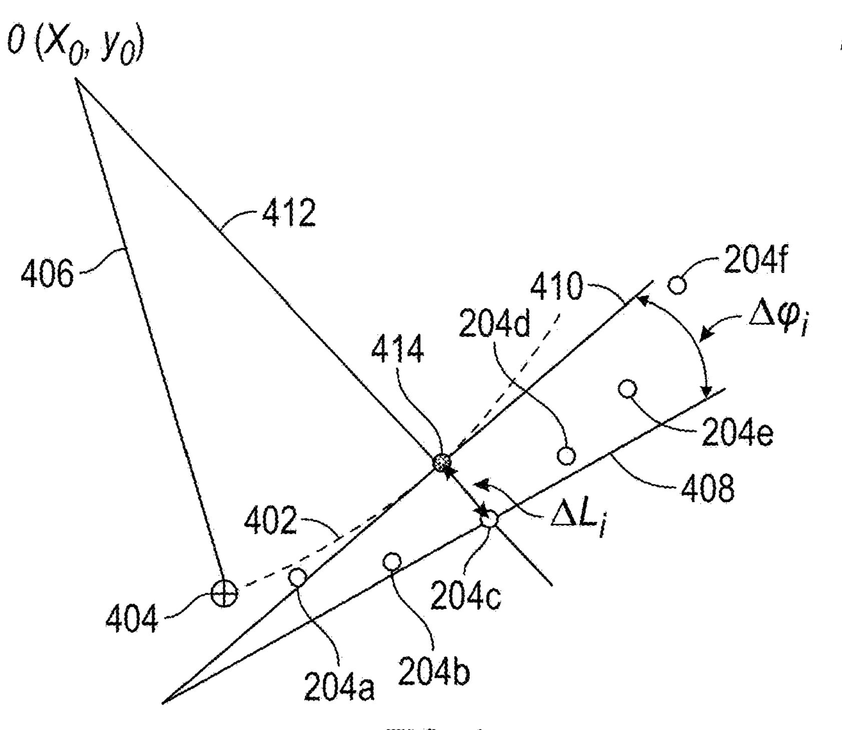
FIG. 4 is a diagram illustrating a difference between a desired path for the vehicle and a current trajectory for the autonomous vehicle based on the current state of the vehicle.

FIG. 4 is a diagram 400 illustrating a difference between a desired path for the vehicle and a current trajectory for the autonomous vehicle 10 based on the current state of the vehicle. The desired path is indicated by its waypoints 204*a*-204*f*. The current trajectory of the autonomous vehicle 10 is shown to be along trajectory curve 402. The trajectory curve 402 is a path of a center of gravity 404 of the vehicle about a center of rotation $O(x_0,y_0)$. The trajectory curve 402 is generally a semi-circular arc having a radius of curvature Rc about the center of rotation. Radial line 406 passes through the center of rotation $O(x_0,y_0)$ and the center of gravity 404. For illustrative purposes, a first tangent line 408 for the desired path is drawn with respect to waypoint 204*c*. A second tangent line 410 is drawn with respect to the trajectory curve 402. A radial line 412 for the $i^{th}$ waypoint (e.g., waypoint 204*c*) passes through the center of rotation $O(x_0,y_0)$, and the $i^{th}$ waypoint, thereby intersecting the trajectory curve 402 at tangent point 414. The second tangent line 410 is tangent to the trajectory curve 402 at the tangent point 414. A heading error $\Delta\phi_i$ between the desired path and the current trajectory (trajectory curve 402) at the $i^{th}$ waypoint (e.g., waypoint 204*c*) is given by an angle between the first tangent line 408 and the second tangent line 410. A cross-track error $\Delta L_i$ for the vehicle with respect to the $i^{th}$ waypoint (e.g., waypoint 204*c*) is given by a distance between and the $i^{th}$ waypoint (e.g., waypoint 204*c*) and the tangent point 414 along the radial line 412.

The cross-track errors and the heading errors for each of the waypoints can be used to generate a tracking cost function. The tracking cost function J is a sum of a first cost function based on the cross-track errors (ΔL) and a second cost function based on the heading errors (Δϕ), as shown in Eq. (2):

$$J = J_L + J_\phi \qquad \text{Eq. (2)}$$

where $J_L$ is the cross-track cost function for the cross-track errors (first cost function) and $J_\phi$ is the heading error cost function for the heading errors (second cost function). The first cost function can be stated as shown in Eq. (3):

$$J_L = \frac{1}{N}\sum_{j=1}^{N} w_j^L \Delta L_i^2 \qquad \text{Eq. (3)}$$

where N is the number of waypoints, j is an index of the waypoint, and $$w_j^L$$

is a weight associated with the cross-track error at the $j^{th}$ waypoint. The second cost function can be stated as shown in Eq. (4):

$$J_\phi = \frac{1}{N}\sum_{j=1}^{N} w_j^\phi \Delta \phi_i^2 \qquad \text{Eq. (3)}$$

where $$w_j^\phi$$

is a weight associated with the heading error at the $j^{th}$ waypoint.

Figure 5:
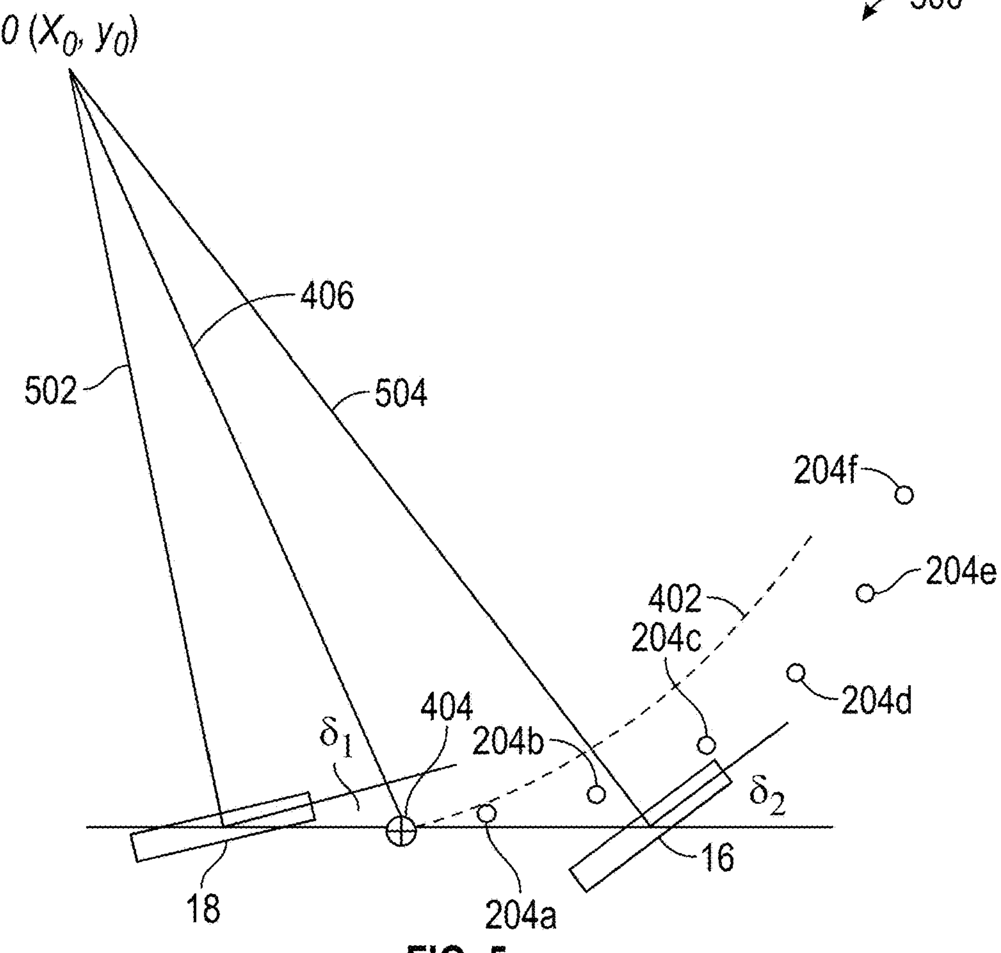
FIG. 5 shows a diagram of a steering model for a vehicle showing rear wheels and front wheels.

FIG. 5 shows a diagram 500 of a steering model for a vehicle showing rear wheels 18 and front wheels 16. The diagram 500 includes the waypoints 204*a*-204*f* of the desired path, the trajectory curve 402 of the vehicle and various wheel orientations. The rear wheels 18 form a rear wheel angle $\delta_1$ with respect to the x-axis. The front wheels 16 form a front wheel angle $\delta_2$ with respect to the x-axis. The center of gravity 404 of the vehicle lies between the front wheels 16 and the rear wheels 18. A front axle length a is a distance between the center of gravity 404 and the front wheels 16 and a rear axle length b is a distance between the center of gravity 404 and the rear wheels 18.

The steering model can be used to determine road wheel angles suitable for performing a low speed turn using four-wheel steering or all-wheel steering. A low-speed turn includes turns such as a 90-degree turn or a U-turn. For the low speed turn, a radius of curvature Rc for the current trajectory of the vehicle is given in Eq. (5):

$$R_c = \frac{L\cos\delta_1\cos\delta_2}{\sin(\delta_2-\delta_1)}\sqrt{1+\left(\frac{a\tan\delta_1 + b\tan\delta_2}{L}\right)^2} \qquad \text{Eq. (5)}$$

where a is the front axle length, b is the rear axle length, and L=a+b. An x-coordinate $(x_0)$ of the center of rotation $O(x_0, y_0)$ is given by Eq. (6):

$$x_0 = -b - \frac{L\sin\delta_1\cos\delta_2}{\sin(\delta_2-\delta_1)} \qquad \text{Eq. (6)}$$

and a y-coordinate $(y_0)$ of the center of rotation $O(x_0,y_0)$ is given by Eq. (7):

$$y_0 = \frac{L\cos\delta_1\cos\delta_2}{\sin(\delta_2-\delta_1)} \qquad \text{Eq. (7)}$$

The diagram 500 can also be used to determine road wheel angle for performing a quasi-steady state maneuver or low-g maneuver using four-wheel steering. A quasi-steady state maneuver can include, for example, a lane change, etc. For the quasi-steady state maneuver, the x-coordinate $x_0$ for the center of rotation of the vehicle is given by Eq. (8):

$$x_0 = -\frac{\left(b - \frac{a}{LC_r}MV_x^2\right)\delta_2 + \left(a\frac{b}{LC_f}MV_x^2\right)\delta_1}{\delta_2-\delta_1} \qquad \text{Eq. (8)}$$

where $C_r$ is the cornering stiffness for the rear wheel and $C_f$ is the cornering stiffness for the front wheel. The y-coordinate $y_0$ for the center of rotation of the vehicle is given by Eq. (9):

$$y_0 = \frac{L + K_{us}V^2}{\delta_2-\delta_1} \qquad \text{Eq. (9)}$$

where $K_{us}$ is the understeer coefficient, which is given by Eq. (10):

$$K_{us} = \frac{M}{L}\left(\frac{b}{C_f} - \frac{a}{C_r}\right) \qquad \text{Eq. (10)}$$

where $C_f$ is the cornering stiffness of the front wheels and $C_r$ is the cornering stiffness of the rear wheels.

Based on the steering model of FIG. 5, the first cost function (i.e., cross-track error cost function) is a function of road wheel angles, geometric parameters of the vehicle and waypoints. The first cost function can be stated as shown in Eq. (11):

$$J_L = \frac{1}{N}\sum\nolimits_{j=1}^{N} w_j^L\left[\frac{\gamma_1}{\gamma_2 + \gamma_3}\right]^2 \qquad \text{Eq. (12)}$$

where $$\gamma_1 = \left[(x_j - a)^2 + y_j^2\right]\sin(\delta_1 - \delta_2) + 2L\cos\delta_1[-(x_j - a)\delta_2 + y_j\cos\delta_2] - a[a\sin(\delta_1 + \delta_2) + 2b\cos\delta_1\cos\delta_2]$$

where $x_j$ and $y_j$ are coordinates of the waypoints, $$\gamma_2 = \sqrt{[(x_j - a)\sin(\delta_1 - \delta_2) - L\cos\delta_1\cos\delta_2]^2 + [y_j\sin(\delta_1 - \delta_2) + L\cos\delta_1\cos\delta_2]^2} \qquad \text{Eq. (13)}$$

and $$\gamma_3 = L\cos\delta_1\cos\delta_2\sqrt{1 + \left(\frac{a\tan\delta_1 + b\tan\delta_2}{L}\right)^2} \qquad \text{Eq. (14)}$$

The second cost function (i.e., heading error cost function) can be stated as shown in Eq. (15):

$$J_\phi = \frac{1}{N}\sum\nolimits_{j=1}^{N} w_j^\phi\left[\phi_j + a\tan\frac{\gamma_4}{\gamma_5}\right]^2 \qquad \text{Eq. (15)}$$

where $$\gamma_4 = x_j\sin(\delta_1 - \delta_2) + a\sin\delta_1\cos\delta_2 + b\cos\delta_1\cos\delta_2 \qquad \text{Eq. (16)}$$

and $$\gamma_5 = y_j\sin(\delta_1 - \delta_2) - L\cos\delta_1\cos\delta_2 + b\cos\delta_1\cos\delta_2 \qquad \text{Eq. (17)}$$

Once the tracking cost function (Eq. (2)) has been generated, an optimization operation is performed on the tracking cost function. The optimization operation is the non-linear scalar function optimization, such as a two-dimensional non-linear optimization. The optimization operation involves finding a pair of optimal road wheel angles for minimizing a difference or metric between the current trajectory and the desired path. The optimization operation is represented by Eq. (18):

$$[\delta_1, \delta_2] = \text{argmin}\ J(\delta_1, \delta_2, x_j, y_j) \qquad \text{Eq. (18)}$$

The optimization operation is subjected to constraints driven by the maximum road wheel angle rate (which is therefore a constraint for the derivative of $\delta_1$ and $\delta_2$, as shown in Eq. (19):

$$\dot{\delta}_{min} \leq \dot{\delta} \leq \dot{\delta}_{max} \qquad \text{Eq. (19)}$$

Any numerical method for two-dimensional scalar function optimization can be applied. For example, the steepest descent can be used. A previous optimal solution (i.e., a solution obtained from calculation performed for an earlier position in the curve) can be used as a starting point for the optimization program.

Figures 6, 7:
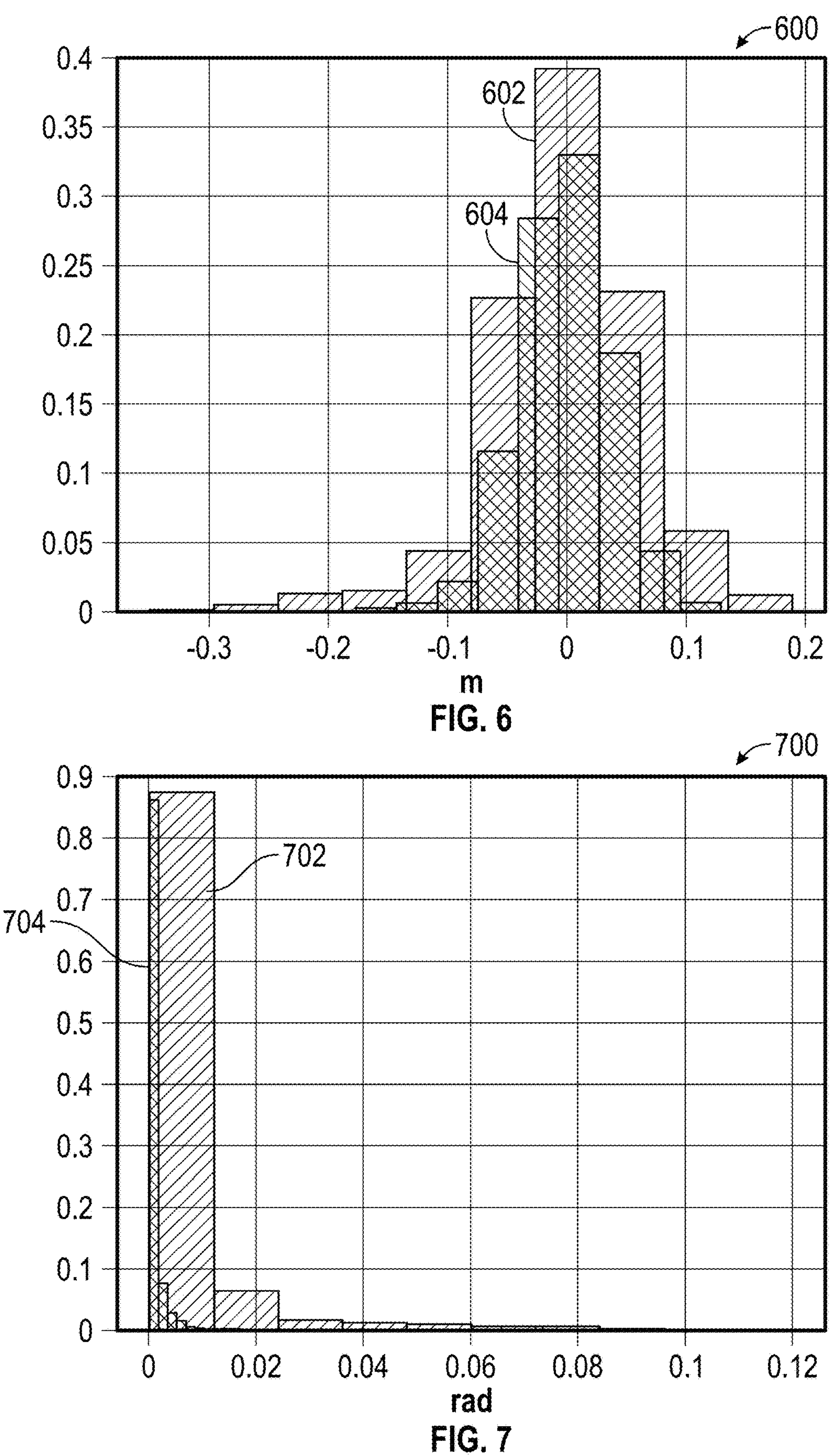
FIG. 6 is a histogram chart illustrating the lateral offset due to various tracing operations.
FIG. 7 is a histogram chart illustrating the heading offset due to various tracking operations.

FIG. 6 is a histogram chart 600 illustrating the lateral offset due to various tracing operations. The histogram chart 600 includes a lateral offset in meter (m) of the vehicle from the desired path along the x-axis and a probability (unitless) along the y-axis. A first histogram 602 shows the lateral offset for the vehicle using only front-wheel steering. A second histogram 604 shows the lateral offset for the vehicle using four-wheel steering. A comparison of the first histogram 602 and the second histogram 604 shows that the four-wheel steering produces less lateral offset between the vehicle trajectory and the desired path than front-wheel steering.

FIG. 7 is a histogram chart 700 illustrating the heading offset due to various tracking operations. The histogram chart 700 includes a heading offset in radians (rad) of the vehicle from the desired path along the x-axis and a probability (unitless) along the y-axis. A first histogram 702 shows the heading offset for the vehicle using only front-wheel steering. A second histogram 704 shows the heading offset for the vehicle using four-wheel steering. A comparison of the first histogram 702 and the second histogram 704 shows that the four-wheel steering produces less heading offset between the vehicle trajectory and the desired path than front-wheel steering.

Figure 8:
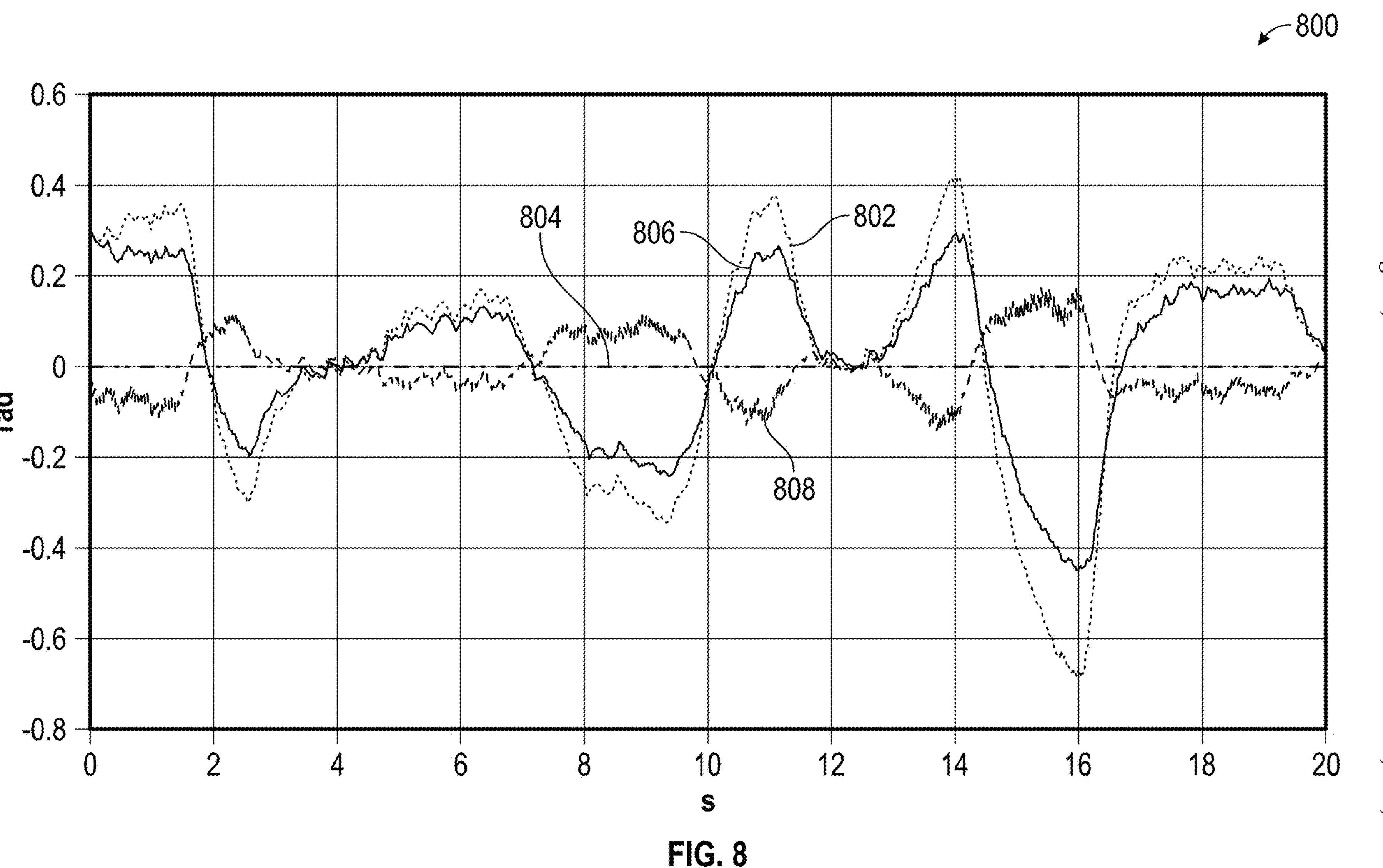
FIG. 8 is a time chart of front and rear wheel steering angles using two-wheel steering and four-wheel steering disclosed herein.

FIG. 8 is a time chart 800 of front and rear wheel steering angles using two-wheel steering and four-wheel steering disclosed herein. Time is shown along the abscissa in seconds(s) and road wheel angle is shown along the ordinate axis in radians (rad). A first curve 802 shows the front road wheel angle during two-wheel steering, and a second curve 804 shows the rear road wheel angle during two-wheel steering. The two-wheel steering employs steering using only the front wheels 16. A third curve 806 shows the front road wheel angle during four-wheel steering using the methods disclosed herein, and a fourth curve 808 shows the rear road wheel angle during four-wheel steering using the methods disclosed herein. The front road wheel angle (third curve 806) under four-wheel steering using four-wheel steering as disclosed herein is less than the front road wheel angle (first curve 802) under two-wheel steering.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for operating an autonomous vehicle, comprising:

determining a desired path of the autonomous vehicle in a turn;

calculating a current trajectory for the autonomous vehicle in the turn based on at least a front road wheel angle of a front wheel of the autonomous vehicle and a rear road wheel angle of a rear wheel of the autonomous vehicle;

determining a cross-track error between the desired path and the current trajectory;

determining a heading error between the desired path and the current trajectory;

creating a tracking cost function based on the cross-track error and the heading error;

performing an optimization operation on the tracking cost function to determine a value of at least one of the front road wheel angle and the rear road wheel angle that reduces at least one of the cross-track error and the heading error; and controlling a steering of the autonomous vehicle based on the value of the at least one of the front road wheel angle and the rear road wheel angle.

2. The method of claim 1, further comprising applying a constraint to the optimization operation to limit a rate of change of at least one of the front road wheel angle and the rear road wheel angle.

3. The method of claim 1, further comprising determining a plurality of waypoints for the desired path, determining the cross-track error and the heading error for each of the plurality of waypoints, determining a cross-track cost function based on the cross-track errors, determining a heading error cost function based on the heading errors, and creating the tracking cost function by summing the cross-track cost function and the heading error cost function.

4. The method of claim 3, further comprising determining the cross-track error and the heading error for a waypoint using a first tangent line to the waypoint and a second tangent line to the current trajectory, wherein the second tangent line intersects the current trajectory at an intersection of the current trajectory and a radial line passing through the waypoint and a center of rotation of the current trajectory.

5. The method of claim 1, wherein the current trajectory is a semi-circular arc about a center of rotation.

6. The method of claim 1, wherein the desired path is one of: (i) a 90-degree turn; (ii) a U-turn; and (iii) a lane change.

7. The method of claim 1, wherein performing the optimization operation further comprises performing a two-dimensional nonlinear optimization operation.

8. A system for operating an autonomous vehicle, comprising:

a processor configured to:

determine a desired path of the autonomous vehicle in a turn;

calculate a current trajectory for the autonomous vehicle in the turn based on at least a front road wheel angle of a front wheel of the autonomous vehicle and a rear road wheel angle of a rear wheel of the autonomous vehicle;

determine a cross-track error between the desired path and the current trajectory;

determine a heading error between the desired path and the current trajectory;

create a tracking cost function based on the cross-track error and the heading error;

perform an optimization operation on the tracking cost function to determine a value of at least one of the front road wheel angle and the rear road wheel angle that reduces at least one of the cross-track error and the heading error; and control a steering of the autonomous vehicle based on the value of the at least one of the front road wheel angle and the rear road wheel angle.

9. The system of claim 8, wherein the processor is further configured to apply a constraint to the optimization operation to limit a rate of change of at least one of the front road wheel angle and the rear road wheel angle.

10. The system of claim 8, wherein the processor is further configured to determine a plurality of waypoints for the desired path, determine the cross-track error and the heading error for each of the plurality of waypoints, determine a cross-track cost function based on the cross-track errors, determine a heading error cost function based on the heading errors, and create the tracking cost function by summing the cross-track cost function and the heading error cost function.

11. The system of claim 10, wherein the processor is further configured to determine the cross-track error and the heading error for a waypoint using a first tangent line to the waypoint and a second tangent line to the current trajectory, wherein the second tangent line intersects the current trajectory at an intersection of the current trajectory and a radial line passing through the waypoint and a center of rotation of the current trajectory.

12. The system of claim 8, wherein the current trajectory is a semi-circular arc about a center of rotation.

13. The system of claim 8, wherein the desired path is one of: (i) a 90-degree turn; (ii) a U-turn; and (iii) a lane change.

14. The system of claim 8, wherein the processor is further configured to perform the optimization operation by performing a two-dimensional nonlinear optimization operation.

15. An autonomous vehicle, comprising:
a first sensor for measuring a front road wheel angle of a front wheel of the autonomous vehicle;
a second sensor for measuring a rear road wheel angle of a rear wheels of the autonomous vehicle;
a processor configured to:
determine a desired path of the autonomous vehicle in a turn;
calculate a current trajectory for the autonomous vehicle in the turn based on at least the front road wheel angle and the rear road wheel angle;
determine a cross-track error between the desired path and the current trajectory;
determine a heading error between the desired path and the current trajectory;
create a tracking cost function based on the cross-track error and the heading error;
perform an optimization operation on the tracking cost function to determine a value of at least one of the front road wheel angle and the rear road wheel angle that reduces at least one of the cross-track error and the heading error; and
control a steering of the autonomous vehicle based on the value of the at least one of the front road wheel angle and the rear road wheel angle.

16. The autonomous vehicle of claim 15, wherein the processor is further configured to apply a constraint to the optimization operation to limit a rate of change of at least one of the front road wheel angle and the rear road wheel angle.

17. The autonomous vehicle of claim 15, wherein the processor is further configured to determine a plurality of waypoints for the desired path, determine the cross-track error and the heading error for each of the plurality of waypoints, determine a cross-track cost function based on the cross-track errors, determine a heading error cost function based on the heading errors, and create the tracking cost function by summing the cross-track cost function and the heading error cost function.

18. The autonomous vehicle of claim 17, wherein the processor is further configured to determine the cross-track error and the heading error for a waypoint using a first tangent line to the waypoint and a second tangent line to the current trajectory, wherein the second tangent line intersects the current trajectory at an intersection of the current trajectory and a radial line passing through the waypoint and a center of rotation of the current trajectory.

19. The autonomous vehicle of claim 15, wherein the current trajectory is a semi-circular arc about a center of rotation.

20. The autonomous vehicle of claim 15, wherein the desired path is one of: (i) a 90-degree turn; (ii) a U-turn; and (iii) a lane change.

* * * * *